Oct. 20, 1970   J. D. WILSON   3,534,879
HAND TRUCK
Filed Nov. 8, 1968
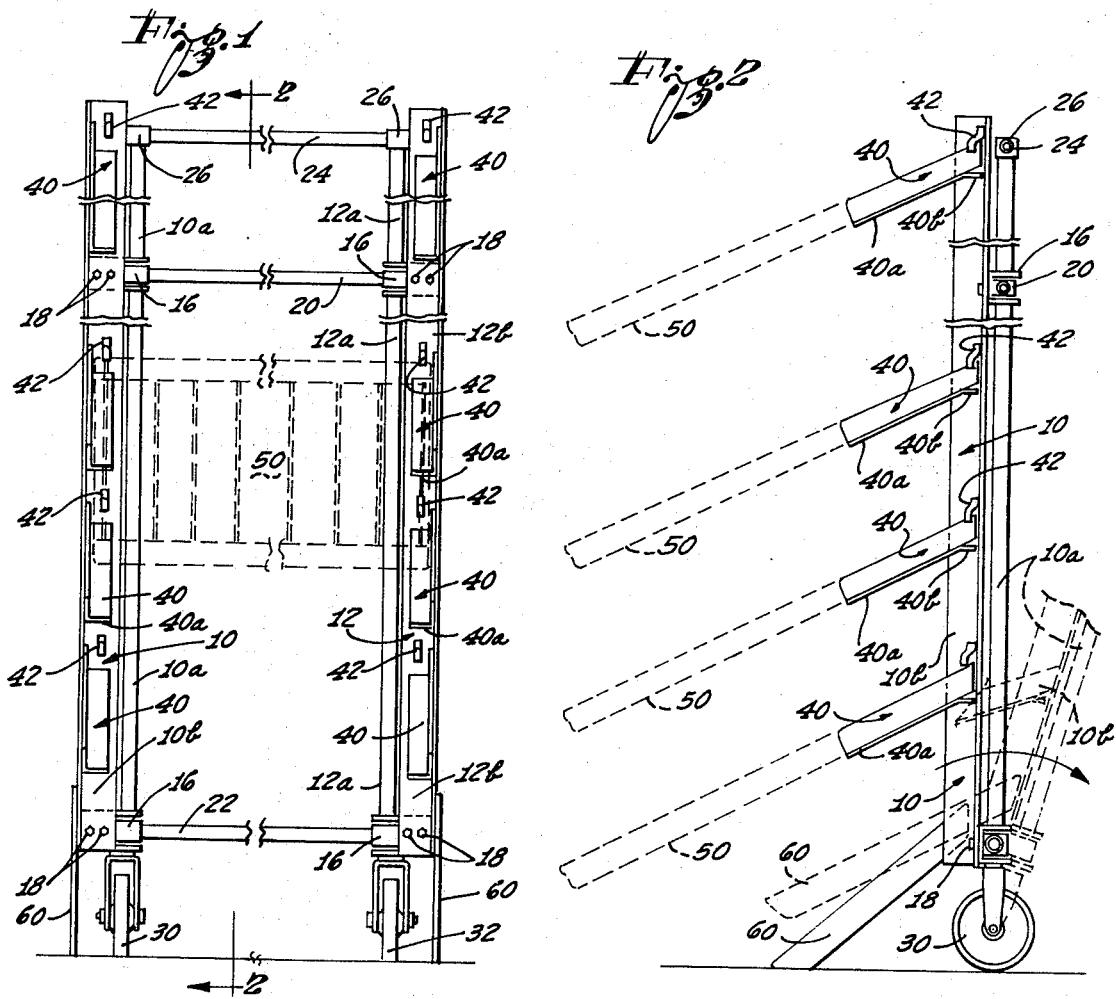
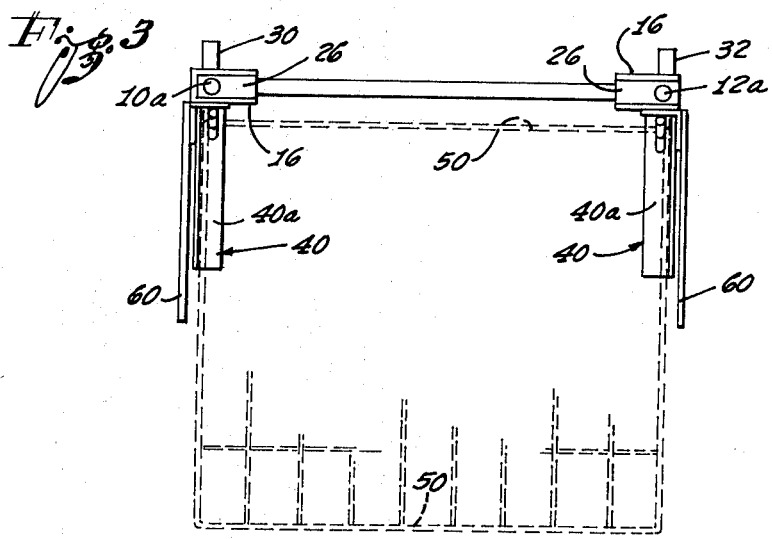
INVENTOR:
James D. Wilson
ATTORNEYS United States Patent Office 3,534,879
Patented Oct. 20, 1970

3,534,879
HAND TRUCK
James D. Wilson, Long Beach, Calif., assignor to Banner Metals, Inc., Compton, Calif., a corporation of Ohio
Filed Nov. 8, 1968, Ser. No. 774,240
Int. Cl. B62b 1/06, 1/26
U.S. Cl. 214—384                                    3 Claims

ABSTRACT OF THE DISCLOSURE

An improved hand truck is provided which is of particular utility in the transportation of bakery products, and the like. The hand truck of the invention is constructed to provide a simple means for transporting a stack of trays of bakery products from the delivery vehicle and into a market. The trays are supported on the hand truck in a position to be generally horizontal when the hand truck is moved from one location to another, but to assume a forwardly inclined position when the hand truck is turned to an upright position. When the trays are in the aforesaid generally inclined position, they provide a gravity feed for the products which tends to move the products toward the front end of each tray, so as to facilitate their removal. The hand truck also has the capability of being able to be folded flat when not in use, so that it can conveniently be stowed under the merchandise in the back of the delivery vehicle when not in use.

BACKGROUND OF THE INVENTION

Efficient present-day merchandising of bakery products, for example, usually involves loading the products onto separate trays at the bakery. The trays are then usually stacked on top of one another in the delivery vehicle. When a hand truck, such as the hand truck of the invention, is carried in the delivery vehicle, a number of the trays may be loaded onto the truck and then wheeled into the market. The contents of the trays may then be unloaded in the market, and the truck and empty trays returned to the delivery vehicle. The empty trays may then be removed from the hand truck, and the hand truck folded flat and stowed in the back of the vehicle ready for the next delivery point.

The trays are supported in a cantilever manner in the hand truck of the invention. The trays are so supported on a rigid generally upright rear frame of a wheeled structure, so that the person delivering the merchandise merely grasps the rear frame of the hand truck and wheels the stack of trays into the market.

As mentioned above, when the hand truck is being wheeled from one location to another, the operator tilts the rigid rear frame back from the horizontal plane so as to move the trays supported thereby each into a generally horizontal position. Then, when the truck is moved to the selected location, the rigid rear frame is tilted up to a generally upright position, and a support means is provided for supporting it in that position. The trays are then inclined forwardly, for the convenient gravitational unloading of the merchandise, as explained above.

It will become evident as the description proceeds that although the hand truck of the invention is particularly suited for the transport of trays of bakery products, it has general utility as a convenient means for handling trays loaded with any appropriate product.

BRIEF DESCRIPTION OF THE DRAWINGS

FIG. 1 is a front view of a hand truck constructed in accordance with the concepts of the invention;
FIG. 2 is a side view of the truck of FIG. 1; and
FIG. 3 is a top plan view of the hand truck.

DETAILED DESCRIPTION OF THE ILLUSTRATED EMBODIMENT

The hand truck shown in FIGS. 1–3 includes, for example, a pair of side frame members 10 and 12. The side member 10 has an elongated tubular frame component 10a, and it also has an elongated L-shaped frame component 10b. The side member 12 has an elongated tubular component 12a, and it also has an elongated L-shaped frame component 12b. As shown in FIG. 2, the component 10b is mounted on the component 10a by U-shaped brackets 16 which have a yoke-like configuration to receive the tubular component 10a, and which are affixed to the component 10b for example by bolts 18. The components 12a and 12b of the side member 12 are fastened together by similar brackets and bolts. This construction permits the L-shaped frames 10b and 12b to be turned inwardly about the corresponding tubular frames 10a and 12a to permit the hand truck to be folded flat when not in use.

A pair of tubular spacer braces 20 and 22 are also supported by the brackets 16, and these spacer braces serve to maintain the side frame members in a spaced relationship, and to provide a rigid frame structure including the spacer braces 20 and 22 and the side members 10 and 12. A further spacer brace 24 is affixed to the upper ends of the tubular members 10a and 12a by appropriate mounting blocks 26. The brace 24 also serves to provide a rigid frame structure, and to maintain the side frame members 10 and 12 in a generally parallel condition.

The spacer braces 20 or 24 may also serve as handles for the truck. A pair of wheels 30 and 32 are mounted at the lower ends of the tubular members 10a and 12a. The wheels may be pivotally mounted, and may incorporate the presently known Darnell wheel assembly.

A first series of tray supports 40 are affixed at spaced distances along the side frame component 10b, and these tray supports may have a generally inclined position, as shown in FIG. 2. A similar series of tray supports 40 are affixed to the side frame component 12b. A first and second series of hook members 42 are also mounted on the side frame components 10b and 12b adjacent respective ones of the tray supports 40. As shown, the tray supports 40 have a generally L-shaped cross section, so that each has an inwardly extending lower flange portion 40a for supporting the trays.

The major part of the lower flange portion of each support 40 is inclined to the horizontal when the aforesaid rear rigid frame is in a generally upright position. However, each of the flange portions 40a has an upper extremity 40b, as shown in FIG. 2, which is bent down to a generally horizontal position. Then, when a tray 50, for example, is hooked into place, as shown in FIG. 2, it is first moved across the horizontal bottom flange 40b, as shown by the dashed lines in FIG. 2, and under the corresponding hook member 42. Then, the tray is turned down to the position shown by the solid lines, at which time it extends along the lower flange portions 40a of the corresponding tray supports 40, with its upper end being hooked under the corresponding hook members 42, so that the tray is supported in a generally inclined and cantilevered manner.

It will be appreciated that when the hand truck illustrated in FIGS. 1 and 2 is being wheeled into position, the operator grasps the braces 20 or 24 and turns the assembly back so that the rigid rear structure is turned about the axis of the wheels 30 and 32 to a position such that the trays supported in the hand truck are generally horizontal. Then, when the hand truck is moved to the selected location, the operator allows it to turn forward about the axis of the wheels 30 and 32 until the rear frame is in a generally upright position. The hand truck is maintained in such a position, for example, by means of a pair of stand supports, such as the support 60, and which are affixed in the illustrated inclined manner to the side members 10b and 12b.

The invention provides, therefore, a hand truck in which the trays of merchandise may be easily and conveniently inserted into a releasably supported cantilever relationship with the rigid rear structure. The hand truck may then be wheeled to a desired location, merely by tilting it in a clockwise direction in FIG. 2, so as to bring all the trays into generally horizontal planes. When the desired location is reached, the hand truck is merely allowed to tilt forward until the stand supports 60 meet the floor, and these supports serve to hold the structure in a rigid and stable upright position.

In the latter position of the hand truck, the trays are all inclined forwardly, so as to provide a gravitational feed of the merchandise so that the products may conveniently be removed from the trays. The hand truck also may be folded flat when not in use, so that it may be stowed in a limited space.

What is claimed is:

1. A hand truck including: a pair of side members; a plurality of spacer brace members affixed to said side members and extending transversely between said side members in mutually parallel relationship to provide a rigid structure with said side members and to establish said side members in a mutually parallel relationship; a pair of wheels respectively mounted at the ends of said side members; stand support means affixed to said side members for supporting the aforesaid rigid structure in a generally upright position; a first series of tray supports affixed to one of said side members; a second series of tray supports affixed to the other of said side members; said first and second series of tray supports serving to support trays on the aforesaid rigid structure in a spaced tiered relationship; and first and second series of hooks respectively affixed to said side members for releasably engaging said trays to prevent the trays from sliding off said supports, in which each of said side members includes an elongated tubular frame component to which said wheels are attached, and each of said side members further includes an elongated L-shaped frame component coupled to said tubular component and to which said tray supports and said hooks are affixed.

2. The combination defined in claim 1, in which said wheels are pivotally mounted on the ends of said tubular components.

3. The combination defined in claim 1, in which the L-shaped frame components are rotatably mounted on the respective tubular frame components to permit the hand truck to be folded to a flat configuration when not in use.

References Cited

UNITED STATES PATENTS

| 907,923 | 12/1908 | Walsh | 214—384 |
| 1,051,452 | 1/1913 | Rock. | |
| 1,446,036 | 2/1923 | Dodd | 211—88 XR |
| 2,118,461 | 5/1938 | Dempsey | 280—47.19 XR |

ALBERT J. MAKAY, Primary Examiner

U.S. Cl. X.R.

211—88